(12) United States Patent
Filipp

(10) Patent No.: US 9,278,500 B2
(45) Date of Patent: Mar. 8, 2016

(54) VEHICLE INTERIOR PANELS WITH SEALED STITCHING

(71) Applicant: Faurecia Interior Systems, Inc., Auburn Hills, MI (US)

(72) Inventor: William Filipp, Shelby Township, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 43 days.

(21) Appl. No.: 14/271,112

(22) Filed: May 6, 2014

(65) Prior Publication Data

US 2015/0321449 A1   Nov. 12, 2015

(51) Int. Cl.
*B29C 44/12*  (2006.01)
*B32B 5/18*  (2006.01)
*B32B 3/10*  (2006.01)
*B32B 7/08*  (2006.01)
*B05D 1/02*  (2006.01)

(52) U.S. Cl.
CPC ... *B32B 5/18* (2013.01); *B05D 1/02* (2013.01); *B32B 3/10* (2013.01); *B32B 7/08* (2013.01); *B32B 2605/003* (2013.01)

(58) Field of Classification Search
CPC .............................. B29C 65/62; B29C 44/12
USPC .................... 428/104; 156/90, 93; 264/45.1
See application file for complete search history.

(56) References Cited

U.S. PATENT DOCUMENTS 6,401,643 B2   6/2002   Lida
8,580,074 B2   11/2013  Shiue

FOREIGN PATENT DOCUMENTS

DE    19961314 A1   6/2001
EP     0930157 A2   7/1999

*Primary Examiner* — Alexander Thomas
(74) *Attorney, Agent, or Firm* — Reising Ethington P.C.

(57) ABSTRACT

A vehicle interior panel includes stitching sewn through a decorative skin layer of the panel. The associated sewing needle holes are sealed by an elastomeric material before a foam layer is formed on the non-visible side of the skin layer to prevent the expanding foam from leaking through the needle holes and becoming visible at the visible side of the panel. The elastomeric material is initially applied as a viscous liquid formulated to solidify and can be applied by spraying, enabling lines of stitching to be located along complex contours of the panel. A latex emulsion is one suitable type of viscous liquid.

11 Claims, 2 Drawing Sheets

VEHICLE INTERIOR PANELS WITH SEALED STITCHING

TECHNICAL FIELD

The present disclosure relates generally to vehicle interior panels with decorative coverings that include stitching.

BACKGROUND

Vehicle interior panels typically include a decorative aspect, providing the passenger cabin of a vehicle with a desired aesthetic. Combinations of different types of materials, textures, shapes, tactile features, and visual features can be used with such panels to provide a particular passenger cabin with any of a variety of different ambiences, from luxurious to utilitarian. Visible stitching, whether actual sewn stitching or simulated stitching, is sometimes used as an element in vehicle interiors to indicate luxury. Stitching features are reminiscent of hand-crafted materials such as custom leather upholstery, considered luxurious in a day and age of automated high-speed manufacturing. Where sewn stitching is employed, the associated needle holes can sometimes lead to other visual defects, however, such as underlying materials showing through the needle holes.

U.S. Pat. No. 6,401,643 to Iida discloses a sewn cover assembly of a type that is to undergo a foaming process involving injection and curing of a liquid foaming material therein. The cover assembly is formed by sewing together plural cover elements via two different sewing threads. One of the two threads is larger in thickness than the other and is intended to prevent leakage of the liquid foaming material where the cover elements are sewn together.

SUMMARY

In accordance with one or more embodiments, a method of making a vehicle interior panel having a visible decorative side that faces the interior of a passenger cabin of a vehicle when installed in the vehicle includes the steps of: (a) providing a perforated decorative covering having a decorative first side that provides at least a portion of the visible decorative side of the panel; (b) applying a viscous liquid at an opposite second side of the covering at perforations of the decorative covering, the viscous liquid being formulated to solidify into an elastomeric material; (c) solidifying the viscous liquid into the elastomeric material; and (d) forming a foam layer on the second side of the covering from a liquid foam-precursor material. The elastomeric material seals the perforations and prevents the liquid foam-precursor material and the resulting foam layer from passing into the perforations.

In accordance with one or more embodiments, the decorative covering provided in step (a) includes a line of stitching sewn through a decorative skin layer of the covering, and the perforations are sewing needle holes located along the line of stitching.

In accordance with one or more embodiments, the viscous liquid is applied only along the line of stitching.

In accordance with one or more embodiments, the line of stitching is located along a stitch path that deviates from a straight line.

In accordance with one or more embodiments, the decorative covering provided in step (a) is pre-formed into a shape that includes contours desired in the finished panel.

In accordance with one or more embodiments, step (b) is performed with the covering in the same pre-formed shape as provided in step (a).

In accordance with one or more embodiments, the method further comprises the step of applying an accelerating agent where the viscous liquid is applied, the accelerating agent being formulated to increase the rate of solidification of the viscous liquid.

In accordance with one or more embodiments, step (b) includes spraying the viscous liquid onto the covering.

In accordance with one or more embodiments, the method further comprises the step of spraying an accelerating agent where the viscous liquid is sprayed, the accelerating agent being formulated to increase the rate of solidification of the viscous liquid.

In accordance with one or more embodiments, the viscous liquid and the accelerating agent are applied simultaneously.

In accordance with one or more embodiments, a vehicle interior panel having a visible decorative side that faces the interior of a passenger cabin of a vehicle when installed in the vehicle includes a substrate, a decorative covering disposed over the substrate, a foam layer located between the substrate and the decorative covering, and an elastomeric seal located along the stitch path between the foam layer and the decorative covering. The decorative covering has a decorative skin layer and a line of stitching along a stitch path with perforations formed through the decorative skin layer along the stitch path. The elastomeric seal isolates the foam layer from the perforations, and a portion of the line of stitching is at least partially embedded in the elastomeric seal.

In accordance with one or more embodiments, the stitch path deviates from a straight line.

In accordance with one or more embodiments, the stitch path deviates from a flat plane.

In accordance with one or more embodiments, the line of stitching is located along a complex contour of the decorative covering.

In accordance with one or more embodiments, the vehicle interior panel further comprises a brow portion as part of an instrument panel. The line of stitching is located at an edge of the brow portion where the decorative skin layer includes a bend that is greater than 90 degrees.

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described below is a vehicle interior panel with perforations, such as needle holes that lie along a line of stitching. The perforations can be sealed via application of a viscous liquid material formulated to solidify into an elastomeric material so that subsequently applied materials will not leak through the perforations or become visible at the decorative side of the interior panel. Among other advantages that will become apparent to skilled artisans, perforations located along complex contours of the panel can be sealed in this manner, and decorative elements such as stitching can be located along previously problematic features and shapes of the panel.

Figure 1:
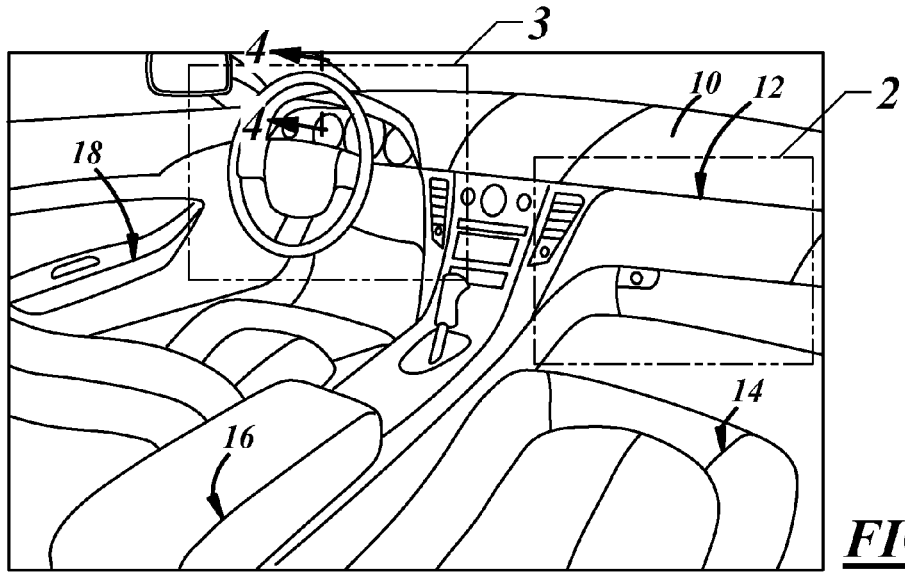
FIG. 1 is a perspective view of the interior of a vehicle passenger cabin, illustrating examples of interior panels with stitching.

Referring to FIG. 1, the interior of a passenger cabin of a vehicle is shown to illustrate various examples of vehicle interior components that may include stitched decorative coverings 10. Instrument panel assembly 12, seat assembly 14, console assembly 16, and door panel assembly 18 may all include decorative coverings 10 disposed over and/or attached to respective component substrates. The arrows in the figure also point to example locations for seams and/or stitching for each of the components. The structures and methods disclosed herein may be used with any other vehicle interior component as well, such as steering wheel assemblies, shifter assemblies, etc.

Figure 2:
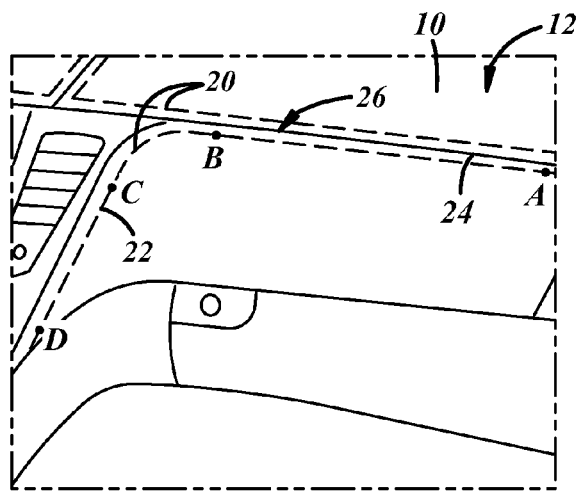
FIG. 2 is an enlarged view of a portion of an instrument panel from FIG. 1.

FIG. 2 is an enlarged view of a portion of the instrument panel assembly 12 of FIG. 1. The illustrated instrument panel 12 includes one or more lines of stitching 20, each lying along a stitch path 22. Each stitch path 22 may be considered an imaginary line in 3D-space, including rectilinear and/or curvilinear portions, representing the location and shape of the corresponding line of stitching 20. At least a portion of any stitch path 22 may be categorized according to the contour it follows. In one embodiment, at least a portion of the stitch path 22 is a straight line (i.e., rectilinear) in 3D-space. A rectilinear stitch path 22 or portion thereof also lies in a single plane. In another embodiment, the stitch path 22 deviates from a straight line. Such a stitch path 22 or portion thereof may or may not lie in a single plane. For instance, the stitch path 22 may lie along a flat portion of the covering 10 and be arranged in an L-shape, V-Shape, etc. in a single plane. Any stitch path 22 that does not lie in a single plane may be referred to as having or lying along a complex contour.

The particular stitch path 22 indicated in FIG. 2 and extending from point A to point D lies along a complex contour. In particular, the stitch path 22 includes two rectilinear portions (A-B and C-D) and a complex contour (B-C). Portion A-B of the stitch path 22, located above a glove box in the passenger cabin of the vehicle, is a straight line that is generally parallel with the vehicle floor (horizontal) extending in a transverse (i.e., left and right) direction with respect to the vehicle. Portion C-D of the stitch path, located to the left of the glove box near the longitudinal center of the vehicle, is also a straight line and has components in the vertical, horizontal, and fore-and-aft directions. Portion B-C has a complex contour (i.e., deviates from a plane) and is a smooth curve tangent to both of portions A-B and C-D.

Along with groove 24, portion A-B is also part of a seam 26. The seam 26 may be a true seam that includes visible or non-visible functional stitching holding two separately formed pieces of material together, or it may be a simulated seam. In one example of a simulated seam 26, the decorative covering 10 is a continuous sheet of material, or has a continuous decorative layer, that extends from one side of the seam 26 (e.g., located above the seam in FIG. 2) to an opposite side of the seam (e.g., located below the seam in FIG. 2) with the groove 24 formed in the decorative surface of the covering 10.

Figure 3:
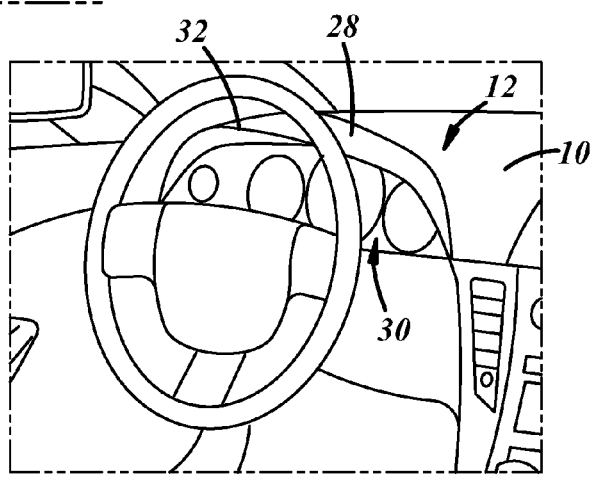
FIG. 3 is enlarged view of another portion of the instrument panel from FIG. 1.

FIG. 3 is an enlarged view of another portion of the instrument panel assembly 12 of FIG. 1. The illustrated portion of the instrument panel 12 in this example is a hood or brow portion 28 on the driver's side of the instrument panel that extends toward the driver and is located over the gauges or driver information center 30. The brow portion 28 has an aft edge 32 nearest the driver where the material of the covering 10 may be bent back on itself, as shown in more detail in subsequent figures. Needle holes or other perforations in the decorative covering 10 located along such a brow portion edge 32, or along a complex contour as described above, have long been problematic when it is desired to backfill the interior assembly between the decorative layer and a substrate with a foamable material such as polyurethane foam. Tape and other types of pre-made films are problematic for use as sealing mechanisms for a variety of reasons. Unless applied along a straight line, or at least along a very large radius that lies in a single plane, tape tends to wrinkle or crease, and its application is thus limited to flat areas. Even in flat areas, a slight turn in the stitch path requires multiple pieces of tape to be cut to follow the turn. As synthetic decorative covering materials have been developed to be thinner and more pliable, there is a higher probability that such elements sandwiched between layers of the vehicle interior panel will show through and cause visual defects, especially if wrinkled or creased due to tight radii or complex contours.

Figure 4:
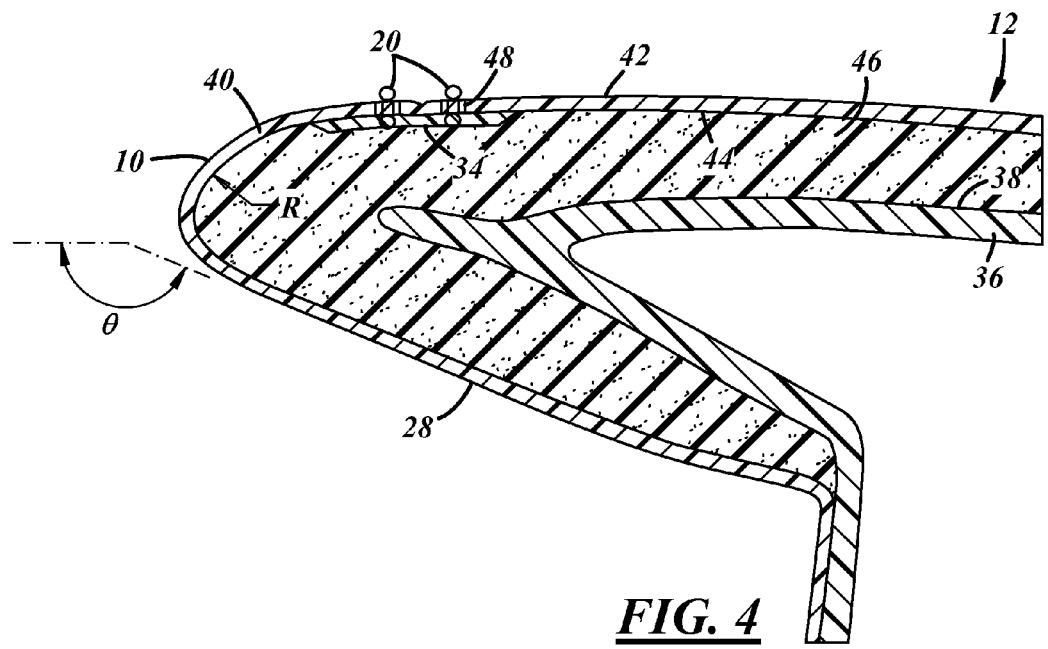
FIG. 4 is a cross-sectional view of the portion of the instrument panel from FIG. 3.

FIG. 4 is a cross-sectional view of the brow portion 28 of the instrument panel 12 as an illustrative example of a vehicle interior panel including an elastomeric seal 34. As described in greater detail below, the elastomeric seal 34 can be formed in place and located along tight radii, complex contours, and other areas where tape or other flat films are problematic. Certain features of FIG. 4 may be exaggerated for purposes of illustration. The illustrated panel 12 includes a substrate 36 with an outer side 38, and the decorative covering 10 is disposed over the substrate. The decorative covering 10 includes a decorative skin layer 40 with a visible decorative side 42 that faces the interior of the passenger cabin of the vehicle and a non-visible opposite side 44 that faces toward the outer side of the substrate. In this example, the decorative skin layer 40 is the decorative covering 10, but the covering may include additional layers. A backfilled foam layer 46 is located between the covering 10, and the substrate and is in contact with the non-visible side 44 of the covering and the outer side 38 of the substrate.

One or more lines of stitching 20 are sewn through the decorative covering 10 along associated stitch paths, and the elastomeric seal 34 is located between the foam layer 46 and the decorative covering 10 along the associated stitch path(s). The illustrated example includes two lines of decorative stitching 20 along parallel stitch paths. A decorative line of stitching is a visible line of stitching sewn along the covering 10 that does not function to attach any portion of the covering to another portion of the covering or to some other element. The seal 34 can also be located along functional lines of stitching, which are lines of stitching that attach some portion of the covering 10 to another portion of the covering or to another component. The decorative covering 10 has perforations 48 in the form of needle holes from the lines of stitching 20 being sewn through the covering. As skilled artisans will appreciate, each line of stitching may be formed from two or more individual threads. In some lines of stitching, each individual thread alternates between opposite sides 42, 44 of the covering along the length of the stitch path. In other lines of stitching, one or more of the individual threads is located along only one side of the covering along the length of the stitch path. In at least some embodiments, the thread located along each of the opposite sides 42, 44 of the covering is the same type of thread, the same size thread, and/or made from the same material or fiber type.

In this example, the elastomeric seal 34 is local to the lines of stitching 20, generally covering a non-visible portion of the lines of stitching at the non-visible side 44 of the covering 10, as well as the associated perforations 48. The portion of the stitching at the non-visible side of the covering may be at least partly embedded in the elastomeric seal 34 as shown. The seal 34 extends some limited distance away from the lines of stitching 20 on both opposite sides of the stitch path (to the left and right in FIG. 4). In other words, the illustrated elastomeric seal 34 is in strip form and is located only at and near the perforations desired to be sealed. It is also possible to provide the elastomeric seal 34 as a more extensive layer, such as a layer that is co-extensive with the decorative covering. For instance, perforated seat coverings may benefit from the elastomeric seal 34, with or without lines of stitching.

In the instrument panel 12 of FIG. 4, the materials of each of the substrate 36, backfilled foam layer 46, and decorative skin 40 may be selected from a variety of materials typically used in automotive interiors, or from other suitable materials. For example, the substrate 36 may be injection molded or otherwise formed from glass-filled polypropylene or any other material of sufficient stiffness to support the other layers of the panel 12 and/or other interior components. The foam layer 46 may be polyurethane foam having a desired stiffness or compressibility, and other foam materials are possible. The decorative skin layer 40 can be a polyolefin (TPO, PP, TPE), PVC, polyurethane, or other suitable polymer and can be formed to shape by powder slush molding or by thermoforming or vacuum thermoforming from a flat sheet, for example. The elastomeric seal 34 is also useful with genuine seams, such as those used with cut-and-sew leather coverings or skin layers or with simulated leather coverings.

The elastomeric seal 34 is formed from an elastomeric material, which is a polymeric material with a relatively low stiffness and relatively high reversible strain compared to rigid and semi-rigid plastics. One type of elastomeric material is rubber, such as natural latex rubber or synthetic rubber. Examples of synthetic rubber include styrene-butadiene rubber (SBR), isoprenes, chloroprenes, isobutylenes and blends or copolymers thereof. The type of elastomeric material may be selected based on a number of criteria that can have certain advantages. For instance, the elastomeric material may have a durometer, modulus and/or coefficient of thermal expansion substantially similar to that of the material of the decorative skin layer 40 to make the elastomeric seal 34 less conspicuous. Even if these properties of the elastomeric material are different from those of the decorative skin layer 40, the elastomeric material may be selected to be sufficiently pliable to preferentially deform under the pressure of the backfilled foaming process. In other words, the elastomeric seal 34 will tend to slightly flatten rather than cause a bulge in the skin layer 40 where the seal is located. Another consideration is the ability of the elastomeric material to be applied in the form of a viscous liquid that solidifies into the elastomeric material, as subsequently described in more detail. In addition, the elastomeric material may be selected to retain at least a majority of its flexibility after standard automotive interior panel heat age testing.

The cross-sectional view of the brow portion 28 of FIG. 4 illustrates one particular portion of a vehicle interior panel that can benefit from the elastomeric seal 34. Tape and other flat films are not readily applied at or near tight radii, such as radius R. The elastomeric seal 34 can be applied at radii ranging from zero (i.e., a sharp corner) to 40 mm, a range within which tape is not capable. The elastomeric seal 34 can be applied at any radius, no matter how large or small. The elastomeric seal 34 can also be applied along a bend angle $\theta$ in the decorative covering that is greater than 90 degrees. In this example, the bend angle $\theta$ is nearly 180°, with covering 10 being bent back on itself so that the uppermost portion of the covering (the portion facing the windshield of the vehicle) and the downward facing portion of the covering (the portion facing down toward the gauges) are nearly parallel. The elastomeric seal can also be applied over a localized impression or depression in the contour of the decorative covering 10 that is 5 mm or greater in depth or height.

Figure 5:
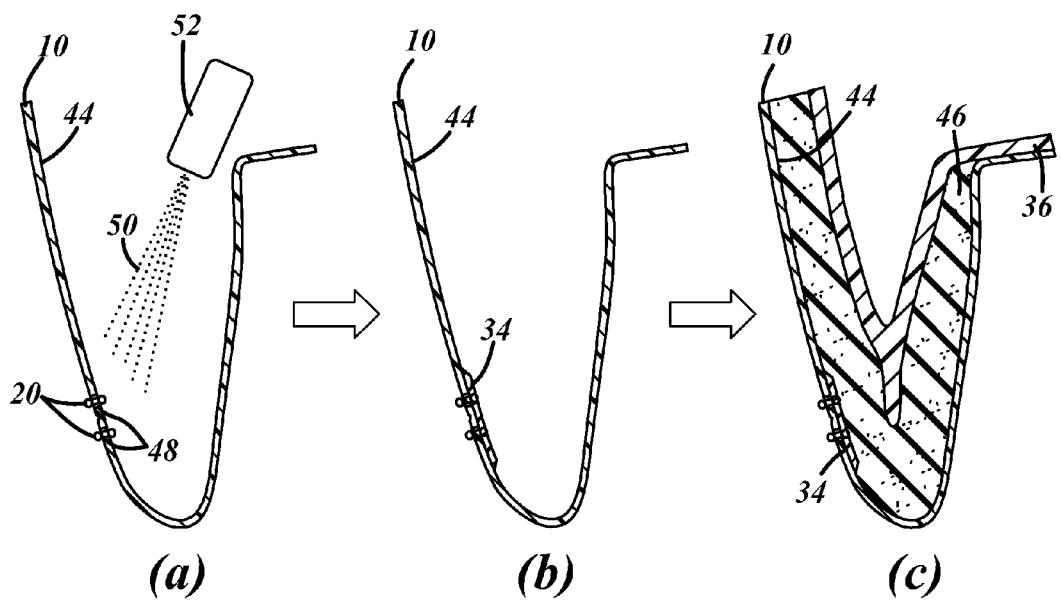
FIG. 5(a)-(c) is a schematic view of an illustrative method of making the vehicle interior panel.

An embodiment of the method of making the vehicle interior panel is schematically illustrated in FIG. 5. The illustrated method includes providing the perforated decorative covering 10 and applying a viscous liquid 50 formulated to solidify into the elastomeric material of the seal 34 at the non-visible side 44 the covering and at the perforations 48, shown in FIG. 5 as step (a). The pre-stitched covering may be supported in a fixture or nest, such as a vacuum fixture, at the visible side of the covering for the step. The method further includes solidifying the viscous liquid (step (b) of FIG. 5), and forming the foam layer 46 on the non-visible side of the covering from the liquid foam pre-cursor (step (c) of FIG. 5). The elastomeric material seals the perforations 48 and prevents the liquid foam precursor and the resulting foam layer 46 from passing into the perforations. The perforations 48 in this case are needle holes from sewing the line of stitching 20 into the decorative covering prior to providing it for application of the viscous liquid elastomer formulation. The step of forming the foam layer 46 may be performed by known methods, such as pouring a polyol-polyisocyanate mixture over the non-visible side 44 of the covering 10 or introducing such a mixture in a cavity formed between the substrate and the covering in a mold. Other foam chemistries may be employed.

Certain additional advantages of the elastomeric seal 34 are highlighted in the method. For example, the seal 34 can be formed in place on nearly any shape. For instance, the seal 34 can be formed along a complex contour of the covering 10, as described above in conjunction with FIG. 2. In various embodiments, the viscous liquid 50 is applied along a stitch path that deviates from a straight line or along a stitch path that deviates from a flat plane. Also, the viscous liquid 50 can be applied with the decorative covering in substantially the same shape as the final shape. Some other hole sealing processes require an operator to turn the covering 10 inside-out to perform a sealing operation or apply a tape, requiring additional time, cost, and chance of damage. In addition, forming the seal 34 in place from the viscous liquid 50 forms a better seal than any sort of flat barrier material placed over the non-visible portion of the line of stitching 20. The viscous liquid can surround each of the individual threads of the line of stitching where each thread enters its associated perforation 48 before solidifying so that the seal 34 does not have to rely on any smooth or flat area alongside the stitching to form a proper seal.

In the illustrated example, the viscous liquid 50 is sprayed onto the non-visible side 44 of the covering 10 using a spray gun 52. In another embodiment, the spray gun is a dual-head spray gun that applies an accelerating agent where the viscous liquid 50 is applied. The accelerating agent is formulated to increase the rate of solidification of the viscous liquid 50 into the elastomeric material. The accelerating agent may include a curing agent that at least partially cross-links a polymeric component of the viscous fluid, a catalyst or reaction initiator that causes a component of the viscous fluid to polymerize, a volatile solvent that extracts another solvent from the viscous fluid to help the solvent in the viscous fluid evaporate, a substance that causes a polymeric component of the viscous fluid to precipitate to solid form, or some other solidification rate-increasing material.

Depending on the acceleration mechanism and/or other factors, the accelerating agent may be mixed with the viscous liquid 50 as they are applied or before they are applied, or the accelerating agent and the viscous liquid can be applied separately. For instance, the accelerating agent may be applied over the already applied viscous liquid 50. With a dual-head spray gun, the two materials can be applied with spray patterns that at least partially overlap, with the spray gun moving in a direction such that the viscous liquid contacts the non-visible side of the decorative covering first as the spray gun moves along the spraying path, followed immediately by the accelerating agent. In other embodiments, the liquid 50 and or the accelerating agent can be brushed, rolled, or poured on. In still other embodiments, an external energy source (e.g. a heat source, a UV light source, or a microwave energy source) is provided to accelerate the solidification of the viscous liquid and/or to activate the accelerating agent.

Application of the elastomeric material in the form of a viscous liquid formulated to solidify may involve other considerations when selecting the elastomeric material. For instance, the viscous liquid may have a viscosity sufficiently high so that it does not run due to gravity when applied—i.e., it is thick enough to stay where it is applied. In various embodiments, the viscous liquid is applied with a film thickness ranging from 0.1 to 2.0 mm, from 0.5 mm to 1.5 mm, and is preferably applied with a thickness of at least 0.5 mm. The viscous liquid may also have a viscosity sufficiently high so that it does not leak through the needle holes or other perforations it is intended to seal. In one embodiment, the viscous liquid 50 has a viscosity greater than that of the liquid foam-precursor that is subsequently applied on the non-visible side of the decorative covering. In one example, the viscous liquid is an emulsion of the elastomeric material in a solvent. In another example, the viscous liquid is a gel in which the elastomeric material is dissolved in a solvent, where there is just enough solvent to dissolve the elastomer. The solvent can be aqueous, organic, or a mixture of aqueous and organic. In at least some embodiments, the viscous liquid is formulated to solidify into the elastomeric material of the seal without foaming.

One suitable viscous liquid that is formulated to solidify into the elastomeric material is a latex emulsion. A latex emulsion is a stable dispersion of polymer microparticles in an aqueous medium. The latex emulsion may be natural (e.g., natural rubber latex), synthetic, or a mixture of natural and synthetic latexes. The polymeric component of a synthetic latex emulsion may include the product of polymerization of a monomer that has been emulsified with surfactants. Some examples of synthetic polymers that may be included in the synthetic latex emulsion are styrene-butadiene rubber (SBR), acrylonitrile-butadiene rubber, acrylic polymers, polyvinyl acetate, and blends and copolymers thereof. A liquid accelerating agent comprising citric acid has been found to significantly reduce the time required for the latex emulsion to solidify. One suitable latex emulsion for use as the viscous liquid is FIS-APS-2014 sealing material (ApTec, Inc., Muskegon, Mich., USA). At ambient conditions, some latex emulsions required up to several hours to solidify. Co-application of the accelerating agent comprising citric acid can reduce the time required to solidify to only a few minutes and, in some cases, less than one minute. The citrus-based accelerating agent includes about 10% or more citric acid in an aqueous medium. One suitable accelerating agent is FIS-APA-101 (ApTec, Inc., Muskegon, Mich., USA). In combination with the aqueous latex emulsion, the application process is environmentally friendly with low VOCs. The resulting elastomeric seal has proven to sufficiently seal the perforations in the decorative covering during the foam backfill process and does not undesirably harden or delaminate from a TPO decorative skin layer after standard automotive heat aging tests applied to instrument panel assemblies. Another suitable material for the elastomeric seal is a UV curable polyurethane material, which is a sufficiently viscous liquid before being exposed to UV light for solidification.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making a vehicle interior panel having a visible decorative side that faces the interior of a passenger cabin of a vehicle when installed in the vehicle, the method comprising the steps of:
   (a) providing a perforated decorative covering having a decorative first side that provides at least a portion of the visible decorative side of the panel;
   (b) applying a viscous liquid at an opposite second side of the covering at perforations of the decorative covering, the viscous liquid being formulated to solidify into an elastomeric material;
   (c) solidifying the viscous liquid into the elastomeric material; and
   (d) forming a foam layer on the second side of the covering from a liquid foam-precursor material, wherein the elastomeric material seals the perforations and prevents the liquid foam-precursor material and the resulting foam layer from passing into the perforations.

2. The method of claim 1, wherein the decorative covering provided in step (a) includes a line of stitching sewn through a decorative skin layer of the covering, and the perforations are sewing needle holes located along the line of stitching.

3. The method of claim 2, wherein the viscous liquid is applied only along the line of stitching.

4. The method of claim 2, wherein the line of stitching is located along a stitch path that deviates from a straight line.

5. The method of claim 1, wherein the decorative covering provided in step (a) is pre-formed into a shape that includes contours desired in the finished panel.

6. The method of claim 5, wherein step (b) is performed with the covering in the same pre-formed shape as provided in step (a).

7. The method of claim 1, further comprising the step of applying an accelerating agent where the viscous liquid is applied, the accelerating agent being formulated to increase the rate of solidification of the viscous liquid.

8. The method of claim 1, wherein step (b) includes spraying the viscous liquid onto the covering.

9. The method of claim 8, further comprising the step of spraying an accelerating agent where the viscous liquid is sprayed, the accelerating agent being formulated to increase the rate of solidification of the viscous liquid.

10. The method of claim 9, wherein the viscous liquid and the accelerating agent are applied simultaneously.

11. The method of claim 1, wherein the viscous liquid is a latex emulsion.

* * * * *